(12) United States Patent
Gorshtein et al.

(10) Patent No.: US 9,426,000 B2
(45) Date of Patent: Aug. 23, 2016

(54) SYMBOL SPACED ADAPTIVE MIMO EQUALIZATION FOR ULTRA HIGH BIT RATE OPTICAL COMMUNICATION SYSTEMS

(71) Applicant: MULTIPHY LTD., Nes Ziona (IL)

(72) Inventors: Albert Gorshtein, Ashdod (IL); Dan Sadot, Kfar Bilu (IL)

(73) Assignee: Multiply Ltd., Nes Ziona (IL)

( * ) Notice: Subject to any disclaimer, the term of this patent is extended or adjusted under 35 U.S.C. 154(b) by 0 days.

(21) Appl. No.: 14/370,481

(22) PCT Filed: Jan. 2, 2013

(86) PCT No.: PCT/IL2013/050006
§ 371 (c)(1),
(2) Date: Jul. 2, 2014

(87) PCT Pub. No.: WO2013/102898
PCT Pub. Date: Jul. 11, 2013

(65) Prior Publication Data
US 2015/0093119 A1      Apr. 2, 2015

Related U.S. Application Data

(60) Provisional application No. 61/583,629, filed on Jan. 6, 2012.

(51) Int. Cl.
*H04B 10/2507* (2013.01)
*H04B 10/2569* (2013.01)
*H04L 25/03* (2006.01)

(52) U.S. Cl.
CPC ...... *H04L 25/03891* (2013.01); *H04B 10/2507* (2013.01); *H04B 10/2569* (2013.01)

(58) Field of Classification Search
CPC ........... H04B 10/2507; H04B 10/2569; H04B 25/03891
USPC ........ 398/65, 147, 192, 29, 81, 159; 370/329, 370/252; 375/229, 347; 455/63.1
See application file for complete search history.

(56) References Cited

U.S. PATENT DOCUMENTS 7,266,310 B1    9/2007  Savory et al.
7,471,904 B2   12/2008  Kaneda et al.
(Continued)

FOREIGN PATENT DOCUMENTS

WO    WO 2011/073974    6/2011

OTHER PUBLICATIONS

PCT International Search Report, PCT/IL2013/050006, Apr. 29, 2013, 2 Pages.

*Primary Examiner* — David Payne
*Assistant Examiner* — Omar S Ismail
(74) *Attorney, Agent, or Firm* — Fenwick & West LLP

(57) ABSTRACT

System and method for equalizing a high bit rate optical communication channel in a symbol spaced adaptive Multiple-In-Multiple-Out (MIMO) system, where the optical communication channel carries a signal that is sampled at a symbol rate. Accordingly, Anti Aliasing Filtering (which introduces distortions in the form of Deterministic Inter Symbol Interference D-ISI) is applied in a MIMO channel, in order to reduce the aliasing effect associated with symbol rate sampling. The Polarization Mode Dispersions introduced in the optical communication channel are solely compensated by a MIMO Equalizer, which ignores the Deterministic ISI (D-ISI) distortion. Then the Deterministic ISI (D-ISI) distortion is solely compensated by an independent Deterministic Equalizer (DE).

8 Claims, 3 Drawing Sheets

(56) References Cited

U.S. PATENT DOCUMENTS

| | | |
|---|---|---|
| 2005/0019042 A1 | 1/2005 | Kaneda et al. |
| 2005/0196176 A1 * | 9/2005 | Sun .................... H04B 10/6162 398/152 |
| 2007/0147850 A1 | 6/2007 | Savory et al. |
| 2008/0240325 A1 * | 10/2008 | Agazzi ................ H03M 1/0626 375/371 |
| 2012/0251112 A1 * | 10/2012 | Sadot ................... H04B 10/613 398/65 |

* cited by examiner

SYMBOL SPACED ADAPTIVE MIMO EQUALIZATION FOR ULTRA HIGH BIT RATE OPTICAL COMMUNICATION SYSTEMS

FIELD OF THE INVENTION

The present invention relates to the field of optical data communication. More particularly, the invention relates to a symbol spaced adaptive MIMO equalization method, for equalizing distortions of an optical data channel in ultra high bit rate optical communication systems.

BACKGROUND OF THE INVENTION

Digital compensation of Chromatic Dispersion (CD—the dependency of the phase velocity of an optical signal on its wavelength) and Polarization Mode Dispersion (PMD—modal dispersion where two different polarizations of light in a waveguide, propagate at different speeds, causing random spreading of the optical pulses) in 40 Gbp/s and 100 Gbp/s coherent optical fiber communication systems is of great interest nowadays. The common practice of CD and PMD compensation is to use fractional space equalizers, with two samples per symbol, or even more. In undistorted media, sampling at the symbol rate forms sufficient information to recover the digital data. However, when the channel introduces linear distortions such as CD and PMD, full reconstruction of the received analog signal is required in order to apply digital compensation. Sampling this signal at the symbol rate without preceding filtering violates the Nyquist sampling theorem, causing aliasing effect that results in performance degradation. On the other hand, using Anti Aliasing Filtering (AAF) prior to symbol rate sampling introduces substantial low-pass filtering which, in turn, causes substantial Inter Symbol Interference (ISI). The optimal equalizer, in the sense of minimum probability of error for a channel with ISI is the Maximum Likelihood Sequence Estimator (MLSE).

Several attempts of dealing with symbol space equalizers were made using AAF, in order to reduce cost and complexity of VLSI implementation. However, these attempts deal only with low CD values suffer from significant power penalty due to the combined effects of Aliasing and ISI.

In order to achieve better spectral efficiency, Dual Polarization (DP) modulation formats are typically used. Equalization can be generally divided into two categories:

Constant Equalization

A constant equalizer compensates for the bulk amount of CD and is widely described in prior art literature (for example, in references [1]-[3]). Since CD is polarization independent, there are typically two independent identical constant equalizers (one for each polarization).

Adaptive Equalization

An adaptive equalizer compensates for the following effects. The first effect is polarization mode dispersion (PMD), including polarization mixing and differential group delay (DGD) between the two polarization modes. The second effect is the portion of residual CD that was not compensated by the constant equalizers. The third effect is ISI introduced by bandwidth limited optoelectronics components at both the transmitting end (Tx) and the receiving end (Rx) portions of the link. Since the adaptive equalizer includes the polarization mixing cancellation, the digital signal processing is done jointly on both polarizations, which is also termed Multiple-In-Multiple-Out (MIMO) processing. Due to the complexity of joint processing implementation, most practical adaptive equalizers that are used for MIMO processing are Finite Impulse Response (FIR) filters with two complex input signals and two complex output signals.

"Coherent Compensation for 100G DP-QPSK with One Sample per Symbol Based on Anti-Aliasing Filtering and Blind Equalization MLSE" to Gorshtein et al (IEEE Photonics Technology Letters, vol. 22, No. 16, pp. 1208-1210, August 2010) suggests limiting the signal bandwidth by an anti aliasing filter (AAF) prior to symbol rate sampling, so as to obey Shannon sampling theorem. Thus the equalization can be achieved within this limited bandwidth, while the Inter Symbol Interference (ISI) introduced by the AAF is recovered, in turn, by means of Maximum Likelihood Sequence Estimation (MLSE) decoder. Since Gorshtein et al proposes a system with reduced bandwidth, there is additional ISI that is intentionally introduced by the AAF, the adaptive MIMO equalizer naturally compensates for this additional ISI, rather than allowing the MLSE to do so. However, this compensation suffers from severe noise enhancement, which is a well known drawback of equalization by (complex MIMO) FIR, especially in presence of both (residual) CD and PMD, thus introduces performance degradation.

All the methods described above have not yet provided satisfactory solutions to the problem of optimally equalizing the distortion of an optical data channel, with minimal performance degradation.

It is therefore an object of the present invention to provide a method for optimally equalizing the distortion of an optical data channel, while substantially reducing performance degradation, by modifying the adaptive equalization process.

Other objects and advantages of the invention will become apparent as the description proceeds.

SUMMARY OF THE INVENTION

The present invention is directed to a symbol spaced adaptive MIMO equalization system for a high bit rate optical communication channel, carrying a signal that is sampled at a symbol rate, which comprises:

a) a MIMO channel that includes Anti Aliasing Filtering (AAF) for reducing the aliasing effect associated with the symbol rate sampling system, the AAF introduces distortions in the form of Deterministic ISI (D-ISI);

b) a MIMO Equalizer (ME), such as a Linear Equalizer (LE), for solely compensating the PMD introduced by the optical communication channel, while ignoring the Deterministic ISI (D-ISI) distortion; and c) an independent Deterministic Equalizer (DE) following the MIMO Equalizer (ME), for solely compensating the Deterministic ISI (D-ISI) distortion.

The error signal in the MIMO Equalizer (ME), defined by the difference between the desired response vector in the MIMO Equalizer (ME) and the vector outputs of the MIMO Equalizer (ME), may be adapted to include the Deterministic ISI (D-ISI) distortion effect in the desired response vector.

The MIMO Equalizer (ME) may be used to compensate distortions according to one of the following criteria:
   Least Mean Squares (LMS);
   Zero Forcing (ZF);
   Constant Modulus Algorithm (CMA).

The Deterministic Equalizer (DE) may be any type of correcting filter being capable of correcting Deterministic ISI (D-ISI) distortion, such as a Maximum Likelihood Sequence Estimator (MLSE) or a Decision Feedback Equalizer (DFE).

The error vector that is used by the DE for compensating the Deterministic ISI (D-ISI) distortion resulting from Anti Aliasing Filtering (AAF) may be modified to be:

$$e_m(n)=d(n)*h_{AAF}(n)-y(n)$$

where $h_{AAF}(n)$ is an equivalent impulse response of the Anti Aliasing Filtering (AAF).

The present invention is also directed to a method for equalizing a high bit rate optical communication channel in a symbol spaced adaptive MIMO system, where the optical communication channel carries a signal that is sampled at a symbol rate. The method comprises the following steps:
a) applying, in a MIMO channel, Anti Aliasing Filtering (AAF) for reducing the aliasing effect associated with symbol rate sampling, the AAF introduces distortions in the form of Deterministic ISI (D-ISI);
b) solely compensating the PMD introduced by the optical communication channel using a MIMO Equalizer (ME), while ignoring the Deterministic ISI (D-ISI) distortion; and
c) solely compensating the Deterministic ISI (D-ISI) distortion by an independent Deterministic Equalizer (DE).

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Systems which use a symbol spaced adaptive MIMO equalizer (as described above) include substantial Anti Aliasing Pre-Filtering (AAF) and therefore, performance is degraded due to the fact that the equalizer compensates for the ISI introduced by the AAF and therefore, faces amplitude distortions. On the other hand, sole equalization of CD and PMD which are pure phase distortions, effectively all-pass filters, and can be equalized theoretically with no power degradation (i.e., no noise enhancement is involved). However, since FIR is used, noise enhancement is inevitable.

In order to overcome this problem, the method proposed by present invention suggests modification of an adaptive equalizer, such that it would compensate for (residual) CD and PMD solely, and leave the ISI introduced by the AAF (and other amplitude distortions) uncompensated. These amplitude-distortion ISI are defined as Deterministic ISI (D-ISI), which can be compensated by an independent (non-linear) equalizer with lower or negligible noise enhancement, such as an MLSE or a Decision Feedback Equalizer (DFE).

Figure 1:
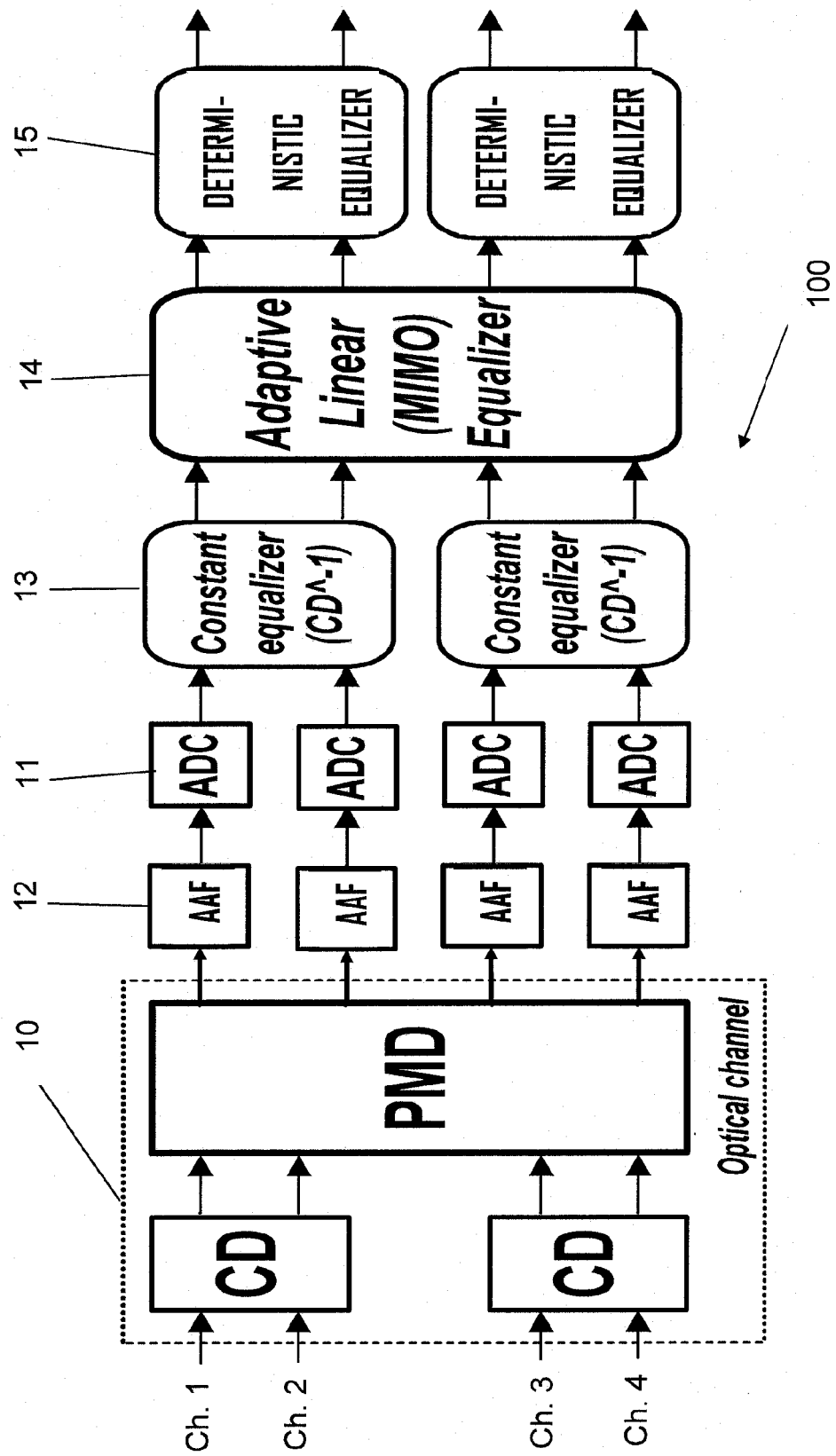
FIG. 1 is a schematic simplified block diagram of a symbol-spaced adaptive MIMO equalization system for ultra high bit rate optical communication, according to an embodiment of the present invention.

FIG. 1 is a schematic simplified block diagram of the system proposed by the present invention. Electrical-to-optical (E/O) and Optical-to-Electrical (O/E) frontends are not drawn for the sake of brevity. The system 100 should equalize the CD and PMD distortions introduced by optical channel 10, which includes 4 data channels Ch. 1-Ch. 4. The information of all data channels is carried by the same optical carrier, which is transmitted over the optical channel 10. In order to reconstruct the transmitted signals of all data channels, the output of the optical channel is sampled by the ADC 11 in a sampling rate of 1 sample/symbol which causes an undesired aliasing effect, which required using Anti Aliasing Filtering 12 in the output of the optical channel. The CD are compensated by a constant equalizer 13, and the MIMO Linear Equalizer (MIMO LE) 14 is an adaptive filter for compensating PMD. A Deterministic Equalizer (DE) 15 is a separate equalizer is for compensating the AAF effect.

The combined MIMO frequency response matrix of the optical channel shown in FIG. 1 can be formulated as:

$$H_{fiber}(f) = \begin{pmatrix} \cos\psi & \sin\psi \\ -\sin\psi & \cos\psi \end{pmatrix} \begin{pmatrix} e^{j\pi f\tau} & 0 \\ 0 & e^{-j\pi f\tau} \end{pmatrix} \begin{pmatrix} \cos\psi & -\sin\psi \\ \sin\psi & \cos\psi \end{pmatrix} e^{-j\beta_2 (2\pi f)^2 \frac{L}{2}}$$

[Eq. 1.1]

$H_{fiber}(f)$ can also be expressed as:

$$H_{fiber}(f) = H_{PMD}(f) \cdot H_{CD}(f)$$ [Eq. 1.2]

where the bold notation stand for matrices (of the MIMO) and non-bold designates polarization independent effects (a scalar value).

If $H_{AAF}(f)$ is the (deterministic) frequency response of the AAF, then the overall (optical+electrical) channel response is given by:

$$H_{fiber}(f) = H_{CD}(f) \cdot H_{PMD}(f) \cdot H_{AAF}(f)$$ [Eq. 1.3]

The structure of equation Error! Reference source not found. suggests a straightforward way for compensating for the overall channel response: the constant equalizer 13 for compensating CD, the MIMO Linear Equalizer (MIMO LE) 14 for compensating PMD and a separate equalizer for compensating the AAF effect. Since the effect of the equalizer for the AAF is deterministic, its frequency response is assumed to be known up to some extent (or can be measured or estimated from the incoming data), the separate equalizer for compensating the AAF effect is considered to be a Deterministic Equalizer (DE) 15.

The matrix weights of the MIMO LE can be continuously adapted to compensate for residual CD and PMD only, by designing the target signal or property to include the effect of the AAF. For example if Least Mean Squares (LMS) criterion is used, the standard error signal is given by:

$$e(n) = d(n) - y(n)$$ [Eq. 1.4]

where y(n) and d(n) are the vector outputs of the MIMO LE 14 and the equalizer desired response vector (the target signal) of the MIMO LE 14 at time n, respectively. The values of the error signal e(n) is used to adjust the transfer function $H_{PMD}(f)$ of the MIMO LE 14, to minimize the error.

The method proposed by the present invention introduces an innovative compensation approach that exploits the a-priory knowledge of the DE frequency response. Consequently, the modified error vector $e_m(n)$ in case when the DE is used for compensating the AAF effect is modified to be:

$$e_m(n) = d(n) * h_{AAF}(n) - y(n)$$ [Eq. 1.5]

where $h_{AAF}(n)$ is a polarization independent (scalar) equivalent digital impulse response of the AAF, and '*' denotes the convolution operation.

Figure 2C:
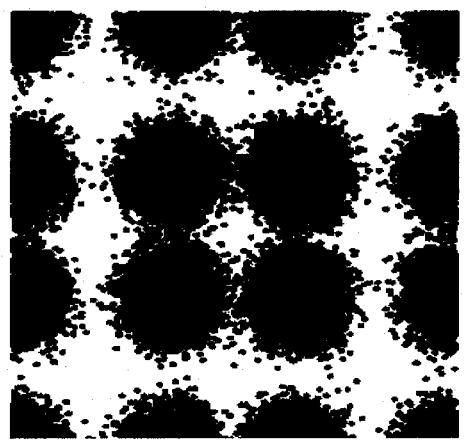
FIGS. 2a-2c illustrate the implementation of using the proposed symbol-spaced adaptive MIMO equalization system, for a single polarization QPSK signal.
Figure 2B:
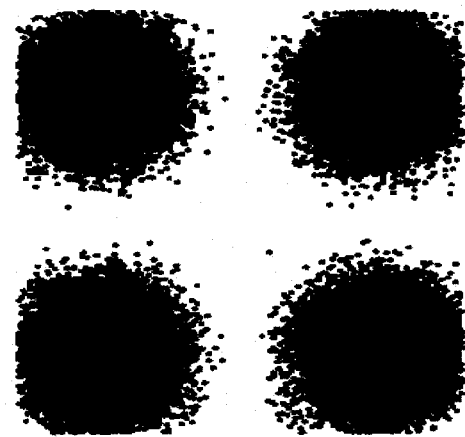
Figure 2A:
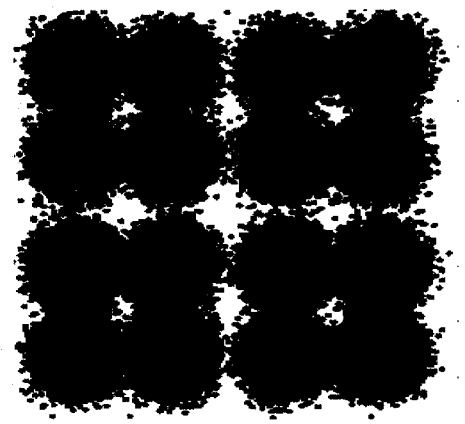

FIGS. 2a-2c illustrate the implementation of using the proposed symbol-spaced adaptive MIMO equalization system, for a single polarization Quadrature Phase-Shift Keying (QPSK) signal. As can be seen from FIG. 2a, the constant (CD) equalizer output contains Deterministic ISI (D-ISI), since it is also deterministic and is designed by sampling the frequency response that is responsible for the CD effect in the fiber and is given by:

$$H_{CD}(f)=\exp\{-j\beta_2(2\pi f)^2 L/2\}$$

where $\beta_2$ and L are the second derivatives (by frequency) of the propagation constant and the fiber length, respectively, which are assumed to be known or estimated. The ISI distortion introduced by the AAF 12 causes the 4 symbols of FIG. 2a to look like 16-QAM symbols, but since the ISI distortion is deterministic with known properties, it is not equalized by the MIMO LE 14, in order to avoid noise enhancement. Instead, the MIMO LE 14 reconstructs the QPSK constellation while considering the spreading shown in FIG. 2a as noise and minimizing it as much as possible.

An Adaptive Linear Equalizer (LE) with conventional LMS criterion (according to Eq. 1.4) will yield the originally transmitted QPSK constellation, which is the target signal shown on FIG. 2b. However, using conventional LMS criterion will result in reconstructing the 4 symbol constellation, but with enhanced noise, which causes the 4 symbols shown in FIG. 2b to be very large (optimally, their size should have been similar to the size in FIG. 2a).

The output of the proposed modified LMS criterion (m-LMS), with the same criterion, is shown in FIG. 2c, where a two tap FIR filter $h_{AAF}[\frac{2}{3},\frac{1}{3}]$ is used for illustrating the AAF effect.

By comparing FIGS. 2b to 2c, it is shown that FIG. 2b does not contain any ISI, while FIG. 2c maintains the ISI introduced by the AAF and has a '16-QAM' constellation. Furthermore, the symbols' variance of the newly defined '16-QAM' target constellation is significantly lower than the standard non-modified QPSK constellation symbols, shown in FIG. 2b. Optimally, without the ISI introduced by the AAF 12, each cluster of 4 symbols in FIG. 2c should have been a single symbol. However, this is exactly the kind of distortion that is efficiently compensated by the DE 15. The system proposed by the present invention comprises deterministic ISI and MIMO channel, followed by a Linear Equalizer (LE) 14 and an independent Deterministic Equalizer (DE) 15 for optimally compensating Deterministic ISI (D-ISI), e.g., by using MLSE. The LE is designed to compensate solely for the (MIMO) channel, while ignoring the D-ISI distortion and the subsequent DE compensates solely for the D-ISI. The error signal in the LE 14 is designed (synthesized) to include the D-ISI effect as the target signal. Accordingly, the equalization task is split into two separated tasks, according to which the Linear Equalizer (LE) 14 reconstructs the constellation and the Deterministic Equalizer (DE) 15 compensate for the ISI distortion introduced by the AAF 12. This way, each equalizer is used, to perform a separate task more optimally.

The proposed error signal that is given by [Eq. 1.5] is independent of the convergence criteria of the LE 14, e.g., Least Mean Squares (LMS), Zero Forcing (ZF), Constant Modulus Algorithm (CMA), etc. The DE 15 can be any ISI correcting filter, such as an MLSE, DFE, etc.

The equalization method proposed by the present invention can be extended to any other adaptive equalizer criteria, such as Constant Modulus Algorithm (CMA—a stochastic gradient descent algorithm used for blind equalization), Zero Forcing (ZF) criterion (linear equalization for restoring the signal before the channel)) etc. In addition, the proposed technique is not restricted to optical links only, but can be applied to any link with equivalent mathematical problem formulation, and is not constrained to MIMO case only.

Figure 3:
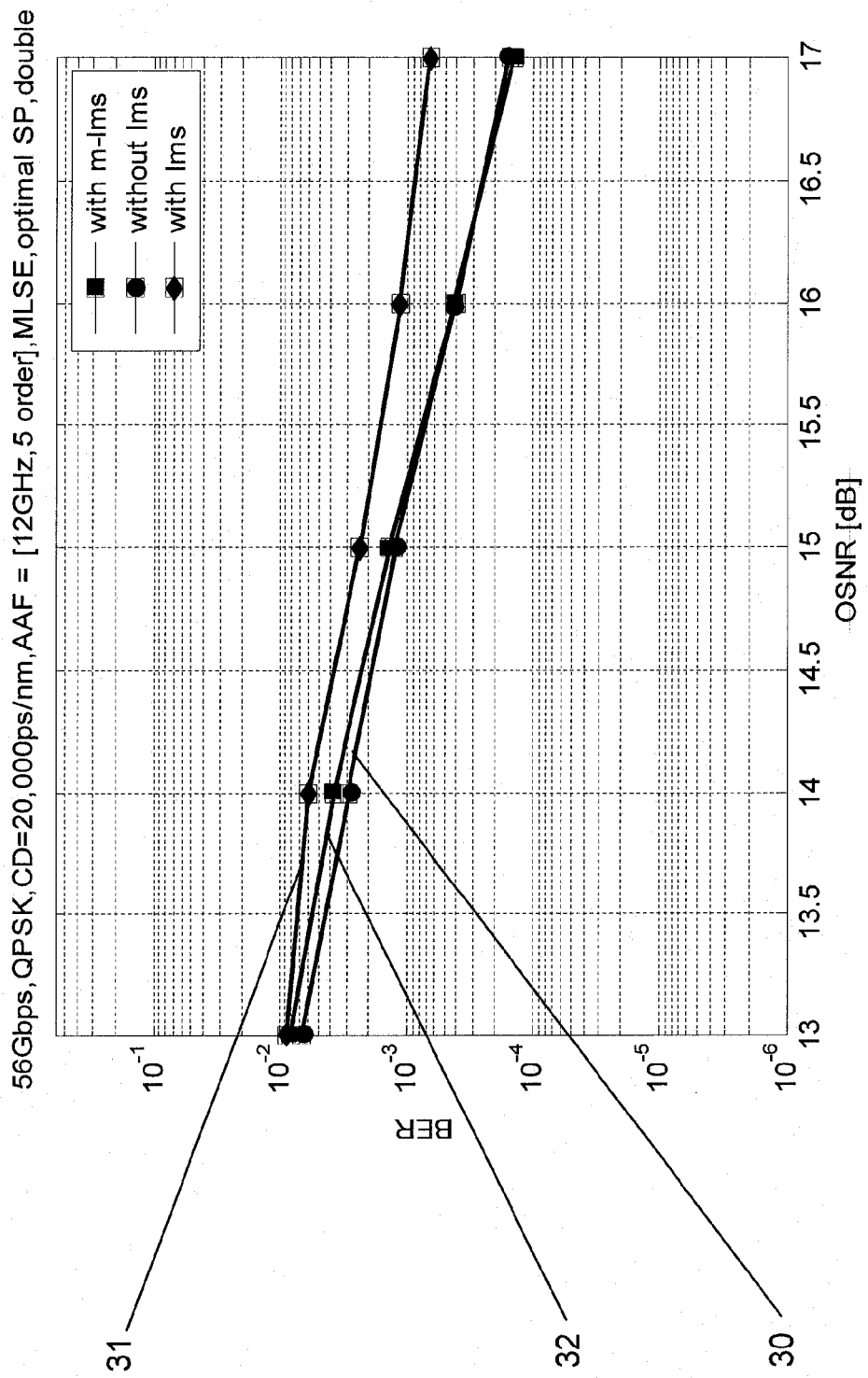
FIG. 3 illustrates a simulation of performance curves, showing the Bit Error Rate (BER) as a function of Optical Signal to Noise Ratio (OSNR) for 112 Gb/sec coherent DP-QPSK system.

FIG. 3 illustrates a simulation of performance curves showing the Bit Error Rate (BER-number of erroneous bits received divided by the total number of bits transmitted) as a function of Optical Signal to Noise Ratio (OSNR) for 112 Gb/sec coherent DP-QPSK system. The CD value was fixed to be 20,000 ps/nm and Differential Group Delay value (DGD—the group delay difference between the slow and the fast principle state of polarization between within a birefringent axis) was 54 ps. This DGD value corresponds to 1.5 symbols, which is the worst case for symbol spaced equalization, due to the need to align the X- and Y-signals by a time constant that is not an integer multiple of the sampling rate, and is precisely in the middle between 1 and 2 symbol times.

The simulation results relate to three examined combinations of distortions and equalizers:
(1) CD and AAF only, with no PMD—the equalizers used were a constant CD equalizer without LE and with DE (curve 30)
(2) CD, AAF, and PMD—the equalizers used were a constant CD equalizer with conventional LMS LE and with DE (curve 31)
(3) CD, AAF, and PMD—the equalizers used were a constant CD equalizer with modified LMS (m-LMS) LE and with DE (curve 32).

In all combinations an MLSE has been used as a DE. From FIG. 3 it is clear that the former and the latter cases (curves 30 and 32) have identical performance, while the conventional LE (curve 31) suffers from ~1 dB performance degradation, measured at BER=$10^{-3}$. These results indicate that the proposed modified LMS approach under combined deterministic and random channel conditions of CD, AAF, and PMD, achieves similar performance as in the case of solely deterministic channel conditions of CD and AAF. It is also shown that, on the other hand, with standard LMS equalization, a performance degradation of more than 1 dB is expected under the same comparison conditions.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

REFERENCES

[1] E. Ip and J. M. Kahn, "Digital equalization of chromatic dispersion and polarization mode dispersion", *J. Lightwave Technol.*, vol. 25, no. 8, pp. 2033-2043, August 2007.

[2] C. R. S. Fludger et al., "Coherent equalization and POL-MUX-RZ-DQPSK for robust 100-GE transmission", *J. Lightwave Technol.*, vol. 26, no. 1, pp. 131-141, January 2008.

[3] M. Kuschnerov et al., "DSP for coherent single-carrier receivers", *J. Lightwave Technol.*, vol. 27, no. 16, pp. 3614-3622, August 2009.

[4] J. G. Proakis, *Digital Communications*, New York: McGraw-Hill, 1995.

[5] A. Gorshtein, O. Levy, G. Katz, D. Sadot, "Coherent Compensation for 100G DP-QPSK with One Sample per Symbol Based on Anti-Aliasing Filtering and Blind Equalization MLSE", IEEE Photonics Technology Letters, vol. 22, no. 16, pp. 1208-1210, August 2010

The invention claimed is:
1. A symbol spaced adaptive MIMO equalization system for a high bit rate optical communication channel, carrying a signal that is sampled at a symbol rate, comprising:
a) a MIMO Equalizer (ME) for compensating random distortions introduced by said optical communication channel, while ignoring Deterministic ISI (D-ISI) distortion caused by the effect of reducing the bandwidth of said optical communication channel; and b) an independent Deterministic Equalizer (DE) following said MIMO Equalizer (ME), for solely compensating said Deterministic ISI (D-ISI) distortion, wherein the error signal in said MIMO Equalizer (ME), being the difference between a novel desired response vector in said MIMO Equalizer (ME) and the vector outputs of said MIMO Equalizer (ME), is adapted to include the Deterministic ISI (D-ISI) distortion effect in said desired response vector.

2. A system according to claim 1, in which the MIMO Equalizer (ME) compensates distortions according to one of the following criteria:
Least Mean Squares (LMS);
Zero Forcing (ZF);
Constant Modulus Algorithm (CMA).

3. A system according to claim 1, in which the MIMO Equalizer (ME) is a Linear Equalizer (LE).

4. A system according to claim 1, in which the Deterministic Equalizer (DE) is any type of correcting filter being capable of correcting Deterministic ISI (D-ISI) distortion.

5. A system according to claim 4, in which the correcting filter includes:
a Maximum Likelihood Sequence Estimator (MLSE);
a Decision Feedback Equalizer (DFE).

6. A symbol spaced adaptive MIMO equalization system for a high bit rate optical communication channel, carrying a signal that is sampled at a symbol rate, comprising:

a) a MIMO Equalizer (ME) for compensating random distortions introduced by said optical communication channel, while ignoring Deterministic ISI (D-ISI) distortion caused by the effect of reducing the bandwidth of said optical communication channel; and c) an independent Deterministic Equalizer (DE) following said MIMO Equalizer (ME), for solely compensating said Deterministic ISI (D-ISI) distortion, wherein the error vector that is used by said independent Deterministic Equalizer (DE) for compensating the Deterministic ISI (D-ISI) distortion resulting from bandwidth reduction effect of the channel is modified to be:

$$e_m(n)=d(n)*h_{AAF}(n)-y(n)$$

where $h_{AAF}(n)$ is an equivalent impulse response of said bandwidth reduction.

7. A system according to claim 6, in which the Deterministic ISI (D-ISI) distortion is caused by Anti-Aliasing Filtering (AAF).

8. A system according to claim 6, in which the random distortion is PMD.

* * * * *